Dec. 16, 1924.

C. L. ARMISTEAD ET AL 1,519,896

EGG CANDLER

Filed July 26, 1923     3 Sheets-Sheet 1

C. L. Armistead and S. F. Bates, Inventors

By C. A. Snow & Co.

Attorneys

Dec. 16, 1924.                                               1,519,896
C. L. ARMISTEAD ET AL
EGG CANDLER
Filed July 26, 1923          3 Sheets-Sheet 2

Fig. 2.

Fig. 4.

C. L. Armistead and S. F. Bates, Inventors

By C. A. Snow & Co.
Attorneys

Dec. 16, 1924.  1,519,896
C. L. ARMISTEAD ET AL
EGG CANDLER
Filed July 26, 1923  3 Sheets-Sheet 3

C. L. Armistead and S. F. Bates, Inventors

By C. A. Snow & Co.
Attorneys

Patented Dec. 16, 1924.

1,519,896

UNITED STATES PATENT OFFICE.

CLARENCE L. ARMISTEAD AND SAMUEL F. BATES, OF SULLIVAN, MISSOURI, ASSIGNORS OF ONE-THIRD TO JESSE R. FARRAR AND EDWARD E. MATHIAS, BOTH OF LESLIE, MISSOURI.

EGG CANDLER.

Application filed July 26, 1923. Serial No. 653,946.

*To all whom it may concern:*

Be it known that we, CLARENCE L. ARMISTEAD and SAMUEL F. BATES, citizens of the United States, residing at Sullivan, in the county of Franklin and State of Missouri, have invented a new and useful Egg Candler, of which the following is a specification.

This invention aims to provide a simple means whereby eggs may be handled readily and rapidly during the candling thereof.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

Figure 1:
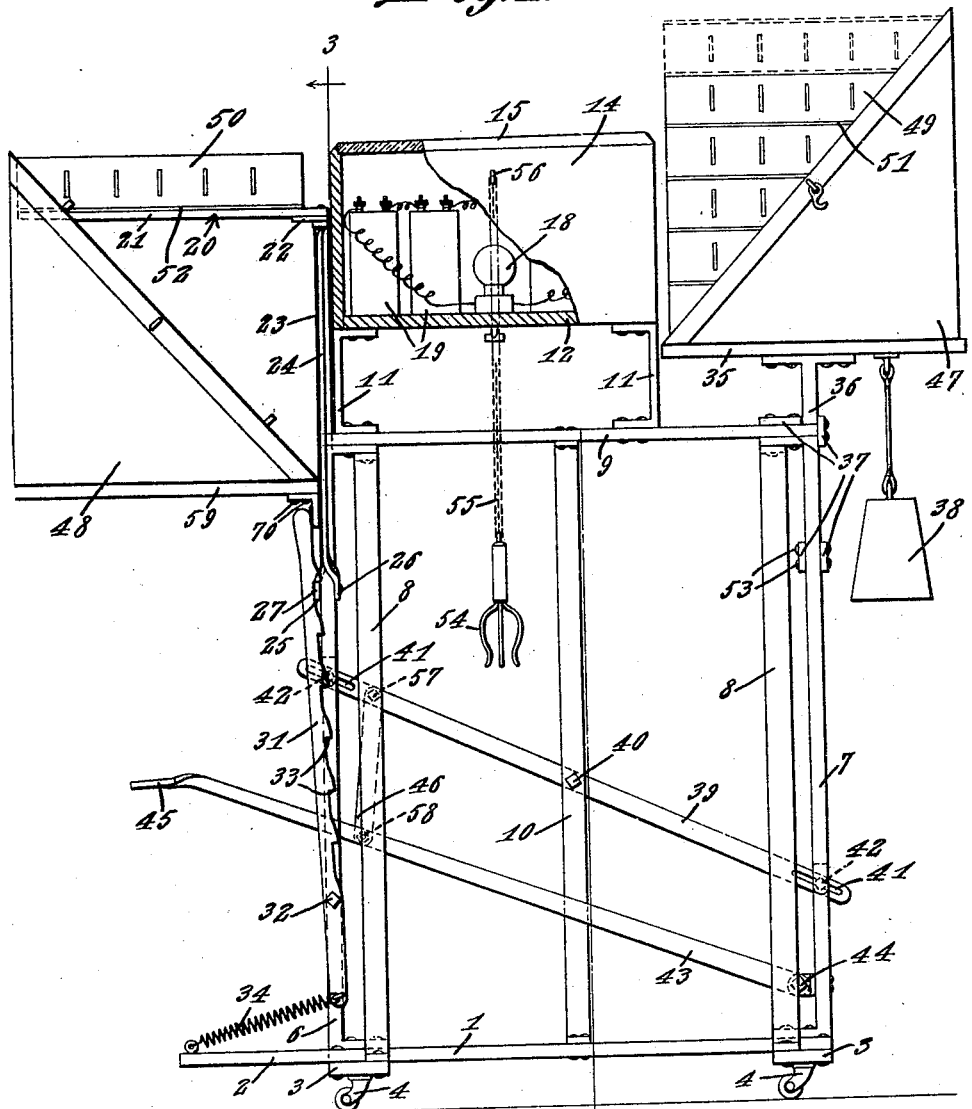
Figure 3:
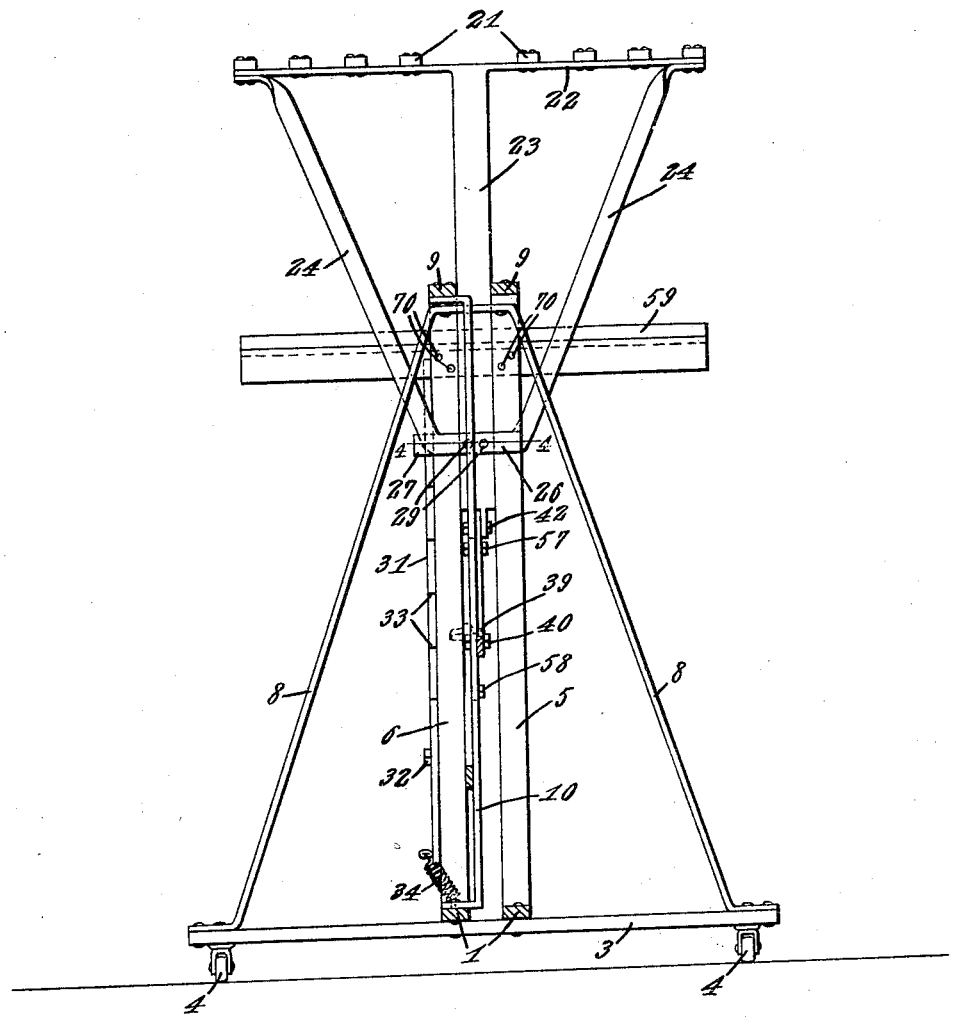

In the accompanying drawings:

Figure 1 shows in side elevation, a device constructed in accordance with the invention, parts being broken away and parts appearing in section; Figure 2 is a top plan; Figure 3 is a section on the line 3—3 of Figure 1; Figure 4 is a section on the line 4—4 of Figure 3.

The device forming the subject matter of this application contemplates the use of a supporting frame which may be variously constructed. Preferably, the frame is made up of parallel base bars 1, one of the bars 1 having an extension 2 as shown in Figure 1. Transverse sills 3 support the base bars 1 and carry castors 4. Standards 5 and 6 are erected, in parallel relation, on the base bars 1, at one end thereof. Similar standards 7 are mounted on the base bars 1 at the opposite end thereof. Inclined braces 8 are connected at their lower ends to the sills 3, and are connected at their upper ends to the standards 6—6 and 7—7. Top bars 9 are mounted parallel to each other on the standards. An upright 10 is vertically disposed and is connected at its upper end to one of the top bars 9 and at its lower end to the corresponding base bar 1, as shown in Figure 3.

Brackets 11 are mounted on the top bars 9 and carry the candling mechanism 12. The candling mechanism 12 embodies a box-like casing 14 carrying a removable top 15 made of glass or other suitable material of a like sort. As shown in Figure 2, a portion of the top 15 is painted or constructed otherwise, so as to render the top 15 opaque as at 16, saving for spots 17, about the size of the cross section of an average egg, these spots 17 being transparent. The casing 14 is illustrated in any suitable way. If desired, an electric lamp 18 and batteries 19 may be located in the casing 14 in order to illuminate the top of the casing, and specifically to illuminate the transparent spots 17.

A receiving platform 20 is provided, and operates above a fixed platform or table 59 secured at 70 to the standards 5 and 6. The platform 20, which is vertically movable, is made up of horizontally spaced fingers 21 having their outer ends free, the inner ends of the fingers 21 being connected to a cross head 22 on the upper end of a slide or bar 23, mounted for vertical reciprocation between the standards 5 and 6. The upper ends of downwardly and inwardly converging braces 24 are connected to the cross head 22 at its ends. The braces 24 are provided, respectively, at their lower ends, with horizontal parts 25 and 26, located on opposite sides of the standards 5 and 6, as shown in Figure 4, the parts 25 and 26 being secured at 29 to the slide 23 which carries the platform 20. The slide 23, thus, is held for vertical reciprocation between the standards 5 and 6. One end of the part 25 constitutes a pawl 27. A latch 31 is fulcrumed intermediate its ends, as shown at 32, on the standard 6 and has teeth 33 beneath which the pawl 27 is adapted to engage. A retractile spring 34 is connected at its inner end to the lower end of the latch 31 and is connected at its outer end to the extension 2 of one of the base bars 1, and the spring 34 constrains the teeth 33 of the latch 31 to coact yieldably with the pawl 27.

The numeral 35 marks a delivery platform, overhanging the main frame of the machine, as shown in Figure 1 and extended up closely adjacent to the candling mechanism 12. The delivery platform 36 is carried by a vertical slide or bar 36 mounted for vertical reciprocation between the standards 7 and held therebetween, for vertical reciprocation, by cleats 47 secured at 53 to the standards 7. The platform 35 carries a pivotally mounted weight 38. In order to facilitate the handling of the eggs whilst they are being candled, a resilient grip 54 is carried by a flexible element 55, the same being secured at 56 to the casing 14 of the candling mechanism, or to any suitable accessible part of the machine.

The numeral 39 designates an actuating lever, which is fulcrumed intermediate its ends, as at 40, on the upright 10. At its ends, the actuating lever 39 is supplied with elongated slots 41 receiving pivot elements 42 carried by the slide 36 of the platform 25 and by the slide 23 of the platform 20. An operating lever 43 is fulcrumed at 44, at one end, on the standards 7 and extends at its other end beyond the standards 5 and 6 and the latch 31, as shown in Figure 1, the operating lever 43 terminating in a foot plate 45, and being, therefore, in the nature of a pedal. The numeral 46 designates a link, the upper end of which is pivoted at 57 to the lever 39 at a point adjacent to the standards 5 and 6, the lower end of the link being pivoted at 58 to the operating lever 43 relatively near to the plate 45.

The operation of the device will depend to some extent on the particular kind of an egg case which is used. By way of illustration, merely, it will be supposed that the device is to be used with an egg case of the kind shown in a co-pending application No. 653,947 filed on the 26th day of July, 1923. The case is divided diagonally to form parts 47 and 48. The part 47 of the egg case, containing the fillers 49 and the partitions 51, together with the eggs, is placed on the platform 35. The part 48 of the case rests on the table 59. At the beginning of the operation of the machine, the platform 35 is at such a height that the bottom of the uppermost filler in the part 47 of the case is flush with the upper surface of the top 15 of the casing 14. The receiving platform 20 is substantially flush, at its upper surface, with the upper surface of the top 15. The uppermost partition, on top of the fillers in the part 47 of the case, is placed on the platform 20, as shown at 52. An uppermost filler in the part 47 of the case, together with the eggs therein is slid on the top 15 of the casing 14, the eggs in their compartments of the filler registering with the transparent spots 17 on the top 15 of the casing 14. The eggs then are candled, and the filler is slid, with the eggs, from the top 15 of the casing 14 upon the partition 52, which rests on the platform 20. The operator then swings the lever 43 downwardly, on its fulcrum 44, by foot pressure applied to the plate 45. The link 46 imparts swinging movement to the lever 39, the lever causing the slide 23 to move downwardly, carrying with it the platform 20, until the filler and the eggs on the platform 20 are substantially in the position marked by the reference numeral 50 in Figure 1, the upper surface of the filler being about flush with the upper surface of the top 15 of the casing 14. The pawl 27 engages with one of the teeth 33 on the latch 31 and, thus, the parts are held in the positions shown in Figure 1. When swinging movement is imparted to the lever 39, the platform 35 is raised through the instrumentality of the slide 36 until another filler in the part 47 of the case on the platform 35 is raised flush with the top 15 of the candling mechanism, whereupon the operation above described may be repeated. All of the eggs, having been duly candled, are located in the part 48 of the egg case, and the part 47 of the egg case is then inverted over the part 48 of the egg case, whereupon the eggs, with the case, may be slid off the platform 59 which is fixed to the standards 5 and 6.

When the operation above described has been completed, the latch 31 may be swung outwardly, at its upper end, on its fulcrum 32, against the tension of the spring 34, thereby disengaging the teeth 33 on the latch 31 from the pawl 27, whereupon, under the action of the weight 38, the platform 35 moves downwardly, motion being transmitted from the slide 36 to the lever 39, and from the lever 39 to the lever 43, by way of the link 46, the lever 43 being restored to the position shown in Figure 1 and the lever 39 cooperating with the slide 33 to raise the platform 20, whereupon the general operation hereinbefore described may be repeated.

Although the device has been shown as used in connection with an egg case 47–48 of special form, the structure may be used with any kind of an egg case, by the exercise of a little ingenuity, the specific form of egg case having nothing to do with the operation of the invention.

As the eggs are candled, defective eggs may be picked out of the fillers through the instrumentality of the member 54.

What is claimed is:

1. In a device of the class described, a frame, slides, means for mounting the slides on the frame for straight-line reciprocation, platforms on the upper ends of the slides, a lever fulcrumed intermediate its ends on the frame, means for connecting the ends of the lever with the slides independently of the platforms, in such a way as to permit the aforesaid straight-line reciprocation of the slides, and means under the control of an operator for actuating the lever.

2. A device of the class described, constructed as set forth in claim 1, and further characterized by the fact that the last-specified means embodies an operating lever fulcrumed at one end on the frame and located at such an elevation that it can be actuated by the foot of an operator, and a link pivotally connected to the levers.

3. A device of the class described, constructed as set forth in claim 1, and further characterized by the fact that the last-specified means comprises a pedal lever fulcrumed on the frame, and a connection between the pedal lever and the first-specified lever; and latch mechanism for holding either platform depressed, the latch mechanism embodying a member mounted movably on the frame, and extended upwardly far enough so that it can be controlled by the hand of an operator, when the operator is in such a position that he can actuate the pedal lever with his foot.

In testimony that we claim the foregoing as our own, we have hereto affixed our signatures.

CLARENCE L. ARMISTEAD.
SAMUEL F. BATES.